(12) United States Patent
Jouan et al.

(10) Patent No.: US 12,422,103 B2
(45) Date of Patent: Sep. 23, 2025

(54) DEVICE FOR REGULATING THE PRESSURE OF AN AIRCRAFT CRYOGENIC FUEL TANK

(71) Applicant: SAFRAN, Paris (FR)

(72) Inventors: Hugo Pierre Mohamed Jouan, Moissy-Cramayel (FR); Pierre-Alain Lambert, Moissy-Cramayel (FR); Valery Pascal Marc Marie Piaton, Moissy-Cramayel (FR)

(73) Assignee: SAFRAN, Paris (FR)

( * ) Notice: Subject to any disclaimer, the term of this patent is extended or adjusted under 35 U.S.C. 154(b) by 252 days.

(21) Appl. No.: 17/927,610

(22) PCT Filed: May 25, 2021

(86) PCT No.: PCT/FR2021/050943
§ 371 (c)(1),
(2) Date: Nov. 23, 2022

(87) PCT Pub. No.: WO2021/240106
PCT Pub. Date: Dec. 2, 2021

(65) Prior Publication Data
US 2023/0167949 A1  Jun. 1, 2023

(30) Foreign Application Priority Data
May 28, 2020 (FR) ...................... 2005627

(51) Int. Cl.
*F17C 13/04* (2006.01)
*B64D 37/04* (2006.01)
*B64D 37/30* (2006.01)

(52) U.S. Cl.
CPC .............. *F17C 13/04* (2013.01); *B64D 37/04* (2013.01); *B64D 37/30* (2013.01);
(Continued)

(58) Field of Classification Search
CPC ... B64D 37/04; B64D 37/30; F17C 2265/066; F17C 2270/0189; F17C 2270/0186;
(Continued)

(56) References Cited

U.S. PATENT DOCUMENTS 5,590,535 A * 1/1997 Rhoades ................... F17C 9/02
62/7
8,950,195 B2 * 2/2015 Watts ..................... B64D 37/02
62/48.2
(Continued)

FOREIGN PATENT DOCUMENTS

CN  104870311 A  8/2015
CN  105074167 A  11/2015
(Continued)

OTHER PUBLICATIONS

International Search Report for PCT/FR2021/050943, dated Sep. 23, 2021.
(Continued)

*Primary Examiner* — Frantz F Jules
*Assistant Examiner* — Devon Moore
(74) *Attorney, Agent, or Firm* — Sughrue Mion, PLLC (57) ABSTRACT

A pressure regulating device includes an on-board storage tank, a mixing chamber, first and second lines, a recirculation line, a pressure sensor and a controller. The storage tank stores and supplies cryogenic fuel to a combustion chamber and includes a booster pump. The first line supplies cryogenic fuel in the liquid state and includes a pressurizing pump and a first regulation valve. The second line supplies cryogenic fuel in the gaseous state and includes a compressor and a first control valve. The recirculation line includes a second regulation valve and with a first heat exchanger. The pressure sensor detects the pressure inside the storage tank. The controller receives the pressure and controls the
(Continued)

first and second regulation valves, the first control valve, the pressurizing pump, the booster pump and the compressor, as a function of a value of a setpoint pressure inside the storage tank.

14 Claims, 3 Drawing Sheets

(52) U.S. Cl.
CPC .............. *F17C 2205/0326* (2013.01); *F17C 2205/0338* (2013.01); *F17C 2205/0352* (2013.01); *F17C 2221/033* (2013.01); *F17C 2223/0161* (2013.01); *F17C 2227/0135* (2013.01); *F17C 2227/0157* (2013.01); *F17C 2227/0311* (2013.01); *F17C 2250/03* (2013.01); *F17C 2250/043* (2013.01); *F17C 2265/065* (2013.01); *F17C 2265/066* (2013.01); *F17C 2270/0189* (2013.01)

(58) Field of Classification Search
CPC .............. F17C 13/04; F17C 2205/0323; F17C 2205/0326; F17C 2205/0388; F17C 2205/0352; F17C 2205/037; F17C 2221/033; F17C 2223/0161; F17C 2223/0146; F17C 2227/0135; F17C 2227/0128; F17C 2227/0157; F17C 2227/0311; F17C 2250/03; F17C 2250/043; F17C 2250/0434; F17C 2250/0626

See application file for complete search history.

(56) References Cited

U.S. PATENT DOCUMENTS

| | | | |
|---|---|---|---|
| 9,752,728 B2* | 9/2017 | Tang | F17C 7/04 |
| 10,088,108 B2* | 10/2018 | Jansson | F17C 5/02 |
| 10,865,740 B2* | 12/2020 | Leidefeldt | F02M 21/0215 |
| 2005/0224514 A1* | 10/2005 | Westenberger | F17C 1/00 |
| | | | 222/3 |
| 2007/0068168 A1 | 3/2007 | Socher | |
| 2014/0026597 A1 | 1/2014 | Epstein et al. | |
| 2014/0174106 A1 | 6/2014 | Tang et al. | |
| 2015/0344143 A1 | 12/2015 | Epstein et al. | |
| 2015/0344144 A1 | 12/2015 | Kamath et al. | |
| 2017/0159611 A1* | 6/2017 | Porter | F17C 9/02 |
| 2022/0041299 A1* | 2/2022 | Wankewycz | B64D 27/24 |
| 2023/0243474 A1* | 8/2023 | Clarke | B64D 37/30 |
| | | | 244/135 R |

FOREIGN PATENT DOCUMENTS

| | | |
|---|---|---|
| CN | 109563968 A | 4/2019 |
| WO | 94/18493 A1 | 8/1994 |
| WO | 2005/095860 A1 | 10/2005 |
| WO | 2012/045035 A2 | 4/2012 |
| WO | 2012/173651 A1 | 12/2012 |
| WO | 2014/130117 A2 | 8/2014 |
| WO | 2017/192137 A1 | 11/2017 |

OTHER PUBLICATIONS

Office Action issued Apr. 11, 2025 in Chinese Patent Application No. 202180043001.2.

* cited by examiner

DEVICE FOR REGULATING THE PRESSURE OF AN AIRCRAFT CRYOGENIC FUEL TANK

CROSS REFERENCE TO RELATED APPLICATIONS

This application is a National Stage of International Application No. PCT/FR2021/050943 filed May 21, 2021, claiming priority based on French Patent Application No. 2005627 filed May 28, 2020, the contents of each of which being herein incorporated by reference in their entireties.

FIELD OF THE INVENTION

The invention lies in the field of aircraft turbomachines whose combustion chamber is supplied with cryogenic fuel.

The present invention more specifically relates to a device for regulating the pressure inside a storage tank for cryogenic fuel such as natural gas, part of which is in the liquid state and another part of which is in the gaseous state, this fuel supplying the combustion chamber of an aircraft turbomachine.

The invention also relates to an aircraft comprising at least one on-board cryogenic fuel tank, at least one turbomachine provided with a combustion chamber operating with said cryogenic fuel and this aircraft being equipped with the aforementioned pressure regulating device.

The invention also relates to an assembly for regulating the pressure inside such a tank, this assembly comprising an aircraft as mentioned above and an airport facility.

The invention finally relates to a method for regulating the pressure inside an on-board cryogenic fuel storage tank implemented using the aforementioned regulation device or regulation assembly.

STATE OF THE ART

The cryogenic fuels are usually implemented for space propulsion because they allow better thermodynamic efficiencies. Their transposition to the field of aeronautics and the industrialization of their large-scale use leads however to having to solve a certain number of technical problems, in particular with regard to their storage.

One example of a cryogenic fuel is for example liquid natural gas (known by the acronym "LNG").

The liquid cryogenic fuels stored in a tank tend to heat up, to change state and therefore to vaporize, which leads to the increase in the pressure inside the tank containing them.

In the absence of a device that satisfactorily regulates the pressure inside a storage tank for this type of fuel, it is common practice to dimension the tank so that it can absorb significant pressure variations. This leads to increase the thickness of its walls and therefore to weigh it down and to be generally limited to a cylindrical or spherical tank.

However, a constant issue in the field of aeronautics is to reduce as much as possible the weight of the equipment contained in an aircraft. In addition, for reasons of location of the tanks, it could be advantageous for them to have shapes other than cylindrical or spherical shapes.

A device for regulating the pressure inside an on-board cryogenic fuel storage tank is already known from document US 2014/174106, this fuel being intended to supply the combustion chamber of an aircraft turbomachine.

This device comprises a recirculation line connecting a pump, located at the lower part of said on-board tank, to the upper part of this tank and this recirculation line is equipped with a regulation valve, as well as a heat exchanger that allows the cryogenic fuel to pass from the liquid state to the gaseous state.

This device also comprises a line which connects the tank to the combustion chamber and a central control unit which controls the opening or the closing of the different regulation valves and the starting or stopping of the pump.

However, this document does not describe or suggest the other characteristics of the invention.

DISCLOSURE OF THE INVENTION

The invention aims to propose a device that allows regulating the pressure inside an on-board storage tank for cryogenic fuel so as to maintain it in a range of pressures lower than what exists in the state of the prior art, so that it is not necessary to enhance the mechanical strength of this tank and therefore to weigh it down.

To this end, the invention relates to a device for regulating the pressure inside an on-board storage tank for cryogenic fuel such as natural gas, part of which is in the liquid state and another part of which is in the gaseous state, this cryogenic fuel being intended to supply a combustion chamber of an aircraft turbomachine.

In accordance with the invention, this device comprises:
an on-board tank for storing and supplying cryogenic fuel to said combustion chamber, this tank comprising a booster pump, located at the lower part of said on-board tank,
a mixing chamber, configured to be connected to said combustion chamber,
a first line connecting said on-board tank to said mixing chamber in order to allow the latter to be supplied with cryogenic fuel in the liquid state, this first line being provided with at least one pressurizing pump and a first regulation valve, this mixing chamber being itself connected to said combustion chamber,
a second line connecting said on-board tank to said mixing chamber in order to allow the latter to be supplied with cryogenic fuel in the gaseous state, this second line being provided with at least one compressor and a first control valve,
a recirculation line connecting said booster pump to the upper part of the tank, this recirculation line being equipped with a second regulation valve as well as a first heat exchanger that allows the cryogenic fuel to pass from the liquid state to the gaseous state,
a pressure sensor detecting the pressure inside said on-board tank,
a central control unit receiving pressure data from said pressure sensor and controlling the total or partial opening or the closing of the different regulation valves and of the first control valve and the starting or stopping of the pressurizing pump, the booster pump and the compressor, as a function of the value of a setpoint pressure inside said on-board tank.

Thanks to these characteristics of the invention, the pressure inside the on-board tank is maintained at a lower value than in the state of the art. The liquid/gas equilibrium is maintained at low pressure and therefore also at lower temperature, which increases the density of the liquid. The dimensions of the tank can therefore be reduced for the same mass of on-board cryogenic fuel.

In addition, as the pressure is kept lower, it is no longer necessary to use structural reinforcements on the tank, which guarantees a gain in its mass and greater freedom in the choice of its shape.

Finally, the pressure management mode allows reducing the need to heat up the cryogenic fuel before using it in the combustion chamber. It is therefore no longer necessary to provide an additional source of energy to heat it and a simple heat exchange with hot fluids present inside the aircraft can suffice.

According to other advantageous and non-limiting characteristics of the invention, taken alone or in combination:

the regulation device comprises a buffer tank disposed on the recirculation line downstream of the first heat exchanger and a second control valve disposed on the recirculation line between said buffer tank and the upper part of the on-board storage tank, in that a first three-way valve is disposed on said second line so that its inlet way is connected downstream of the compressor, one of its outlet ways is connected to said mixing chamber and its other outlet way is connected to said buffer tank by a bypass line, this second control valve and this first three-way valve being controlled by said central control unit, and in that said first three-way valve can be put either in a first position in which it connects the tank exclusively to the mixing chamber, or in a second position in which it connects the tank exclusively to the buffer tank to allow the latter to be filled with cryogenic fuel in the gaseous state, compressed by the compressor, or in a plurality of intermediate positions in which it connects the tank both to the mixing chamber and to the buffer tank, while allowing a more or less significant flow rate to pass to one or the other, depending on the intermediate position in which it is located;

a second heat exchanger is disposed on the first line, between the first regulation valve and the mixing chamber to vaporize the liquid cryogenic fuel before it enters the mixing chamber;

the first regulation valve and the second regulation valve are only one second three-way valve, which is disposed on said first line, downstream of the pressurizing pump, so that its inlet way is connected to this pressurizing pump, one of its outlet ways is connected to said mixing chamber and its other outlet way is connected to the recirculation line upstream of the first heat exchanger, and in that this second three-way valve is controlled by said central control unit to be put either in a first position in which it connects the tank exclusively to the mixing chamber, or in a second position in which it connects the tank exclusively to the first heat exchanger, or in a plurality of intermediate positions in which it connects the tank both to the mixing chamber and to the first heat exchanger, while allowing a more or less significant flow rate to pass to one or the other, depending on the intermediate position in which it is located;

the device comprises a valve disposed at the upper part of said on-board tank, calibrated at a safety pressure, higher than the atmospheric pressure and said setpoint pressure and which allows releasing cryogenic fuel in the gaseous state, out of said on-board tank, if the pressure inside the latter exceeds said safety pressure;

at least one of the exchangers among the first heat exchanger and the second heat exchanger is a cryogenic fuel/hot fluid of the aircraft exchanger, this hot fluid being chosen among air coming from outside the aircraft, the cabin or the exhaust of a gas turbine;

the device comprises a gas discharge line opening out at the upper part of said on-board tank and which connects this on-board tank to an outlet fitting of the aircraft opening out outside the aircraft, this gas discharge line being provided with a monitoring valve whose opening and closing are controlled by said central control unit, this outlet fitting of the aircraft being configured to be able to be connected, via a suction line, to a gas suction device;

the device comprises a device for spraying cryogenic fuel in the liquid state, disposed inside said on-board tank, in the upper part thereof, this spray device being connected to a liquid supply line provided with an inlet fitting of the aircraft opening out outside the aircraft, this liquid supply line being provided with a monitoring valve whose opening and closing are controlled by said central control unit, this inlet fitting of the aircraft being configured to be able to be connected, via an introduction line, to a pumping device and to an outer cryogenic fuel storage tank of an airport, to supply said spray device with cryogenic fuel in the liquid state;

the device comprises a filling line, which opens out at the lower part of said on-board tank, this filling line being provided with a monitoring valve whose opening and closing are controlled by said central control unit, this filling line also being provided with an inlet fitting opening out outside the aircraft, this inlet fitting being configured to be able to be connected, via an introduction line, to a pumping device and to an outer cryogenic fuel storage tank of an airport, to supply said on-board tank with cryogenic fuel in the liquid state.

The invention also relates to an aircraft comprising at least one on-board storage tank for cryogenic fuel such as natural gas, and at least one turbomachine provided with a combustion chamber operating with said cryogenic fuel in the liquid state and in the gaseous state. In accordance with the invention, this aircraft comprises a pressure regulating device, as mentioned above.

The invention also relates to an assembly for regulating the pressure inside an on-board storage tank for cryogenic fuel such as natural gas, in the liquid or gaseous state.

In accordance with the invention, this assembly comprises:

an aircraft and an airport facility, in that the aircraft comprises said on-board tank and at least one turbomachine provided with a combustion chamber supplied with said cryogenic fuel and a device for regulating the pressure as mentioned above.

and in that the airport facility comprises at least one outer cryogenic fuel storage tank, at least one suction line and/or at least one introduction line, said suction line being provided with a gas suction device and being connected to a suction fitting configured to be able to be connected to the outlet fitting of the aircraft, said introduction line being provided with a pumping device and being connected to said outer tank and to an introduction fitting configured to be able to be connected to the inlet fitting of the aircraft.

The invention also relates to a method for regulating the pressure inside an on-board storage tank for cryogenic fuel such as natural gas, in the liquid or gaseous state, this on-board tank being located inside an aircraft and this aircraft comprising a device for regulating the pressure as mentioned above, this cryogenic fuel supplying the combustion chamber of a turbomachine of said aircraft.

In accordance with the invention, this method comprises the steps consisting in:

detecting the pressure inside said on-board tank using said pressure sensor, comparing this pressure with the setpoint pressure, and when the pressure in the on-board tank is lower than the setpoint pressure, opening the second regulation valve and possibly the second control valve of the recirculation line and starting the booster pump, so as to transform the liquid cryogenic fuel into gaseous cryogenic fuel in the first heat exchanger and to reinject it into the upper part of the on-board tank.

Advantageously, this method comprises the steps consisting in:

detecting the pressure inside said on-board tank using said pressure sensor, comparing this pressure with the setpoint pressure, and when the pressure in the on-board tank is lower than the setpoint pressure, opening the second control valve to transfer the compressed gaseous cryogenic fuel contained in said buffer tank to said on-board tank until the pressure inside this on-board tank is equal to the setpoint pressure.

Preferably, this method is implemented with the aforementioned assembly and it comprises the steps consisting, while the aircraft is stopped and is connected to the airport facility, in:

detecting the pressure inside said on-board tank using said pressure sensor, comparing this pressure with the setpoint pressure, if the pressure in the on-board tank is lower than the setpoint pressure, opening the monitoring valve of the liquid supply line and starting the pumping device of the airport facility to suck cryogenic fuel in the liquid state from the outer tank and to introduce it into said on-board tank and if the pressure in the on-board tank is greater than the setpoint pressure, opening the monitoring valve of the gas discharge line and starting the gas suction device of the airport facility to suck cryogenic fuel in the gaseous state located in said on-board tank.

It will be noted that in practice, this situation happens very infrequently because when the aircraft is stopped, its engines are off and the gas is not consumed.

DESCRIPTION OF THE FIGURES

Other characteristics, aims and advantages of the invention will emerge from the following description, which is purely illustrative and not limiting, and which should be read in relation to the appended drawings in which.

In all the figures, the same elements bear identical references.

DETAILED DESCRIPTION OF THE INVENTION

It is known from the state of the art to have an aircraft 1 equipped with a turbomachine whose combustion chamber 10 is supplied with cryogenic fuel such as natural gas.

In accordance with the invention, this aircraft 1 comprises a device 2 for regulating the pressure prevailing inside an on-board storage tank 3 for said cryogenic fuel. This cryogenic fuel is partly in the liquid state (in the low part of the tank) and partly in the gaseous state when the liquid has vaporized following the phase change (it then partly accumulates in the top part of the tank).

Figure 3:
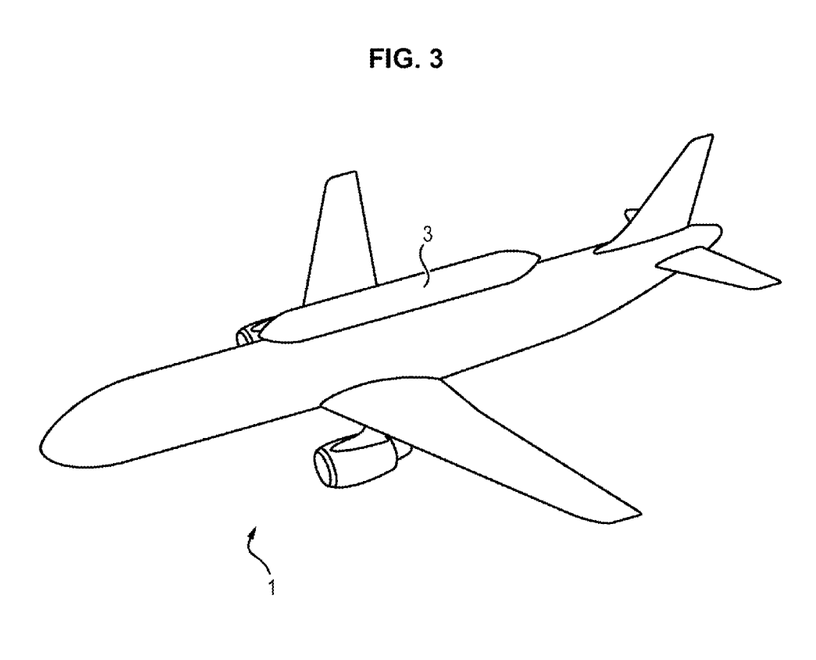
FIG. 3 is a diagram representing a possible positioning of the on-board cryogenic fuel storage tank outside the fuselage of an aircraft.

By "on-board tank", is meant a tank configured to be able to be embedded in an aircraft, or fixed outside the aircraft 1 (as represented in FIG. 3) and this while meeting the safety standards.

The pressure regulating device 2 in accordance with the invention comprises in particular:

a first line 41 connecting the on-board tank 3, (in particular a tapping fitting 31 located in the low part thereof), to a mixing chamber 100, in order to allow the latter to be supplied with cryogenic fuel in the liquid state, a second line 42 connecting said on-board tank 3, (in particular a tapping fitting 32 located in the top part thereof), to the mixing chamber 100, in order to allow the latter to be supplied with cryogenic fuel in the gaseous state, a recirculation line 43 connecting the lower part of the tank 3 to its upper part, in particular to a tapping fitting 33 located in the top part of said on-board tank 3.

Preferably, a pump 35, such as a booster pump, is immersed inside the tank 3. It is connected to the first line 41 and allows the desired fuel flow rate to be introduced inside this line, without significant pressure increase in this line.

Preferably, the first line 41 is furthermore provided with a pressurizing pump 412, disposed downstream of the booster pump 35 and upstream of a first valve called "regulation" valve, relative to the direction of circulation of the liquid cryogenic fuel in the line 41. In the embodiment represented in FIG. 1, this first regulation valve is a two-way valve, referenced 410, and in the embodiment represented in FIG. 2, this first regulation valve is a three-way valve, referenced 411. The pump 412 allows increasing the pressure of the liquid cryogenic fuel that circulates in the first line 41.

Figure 2:
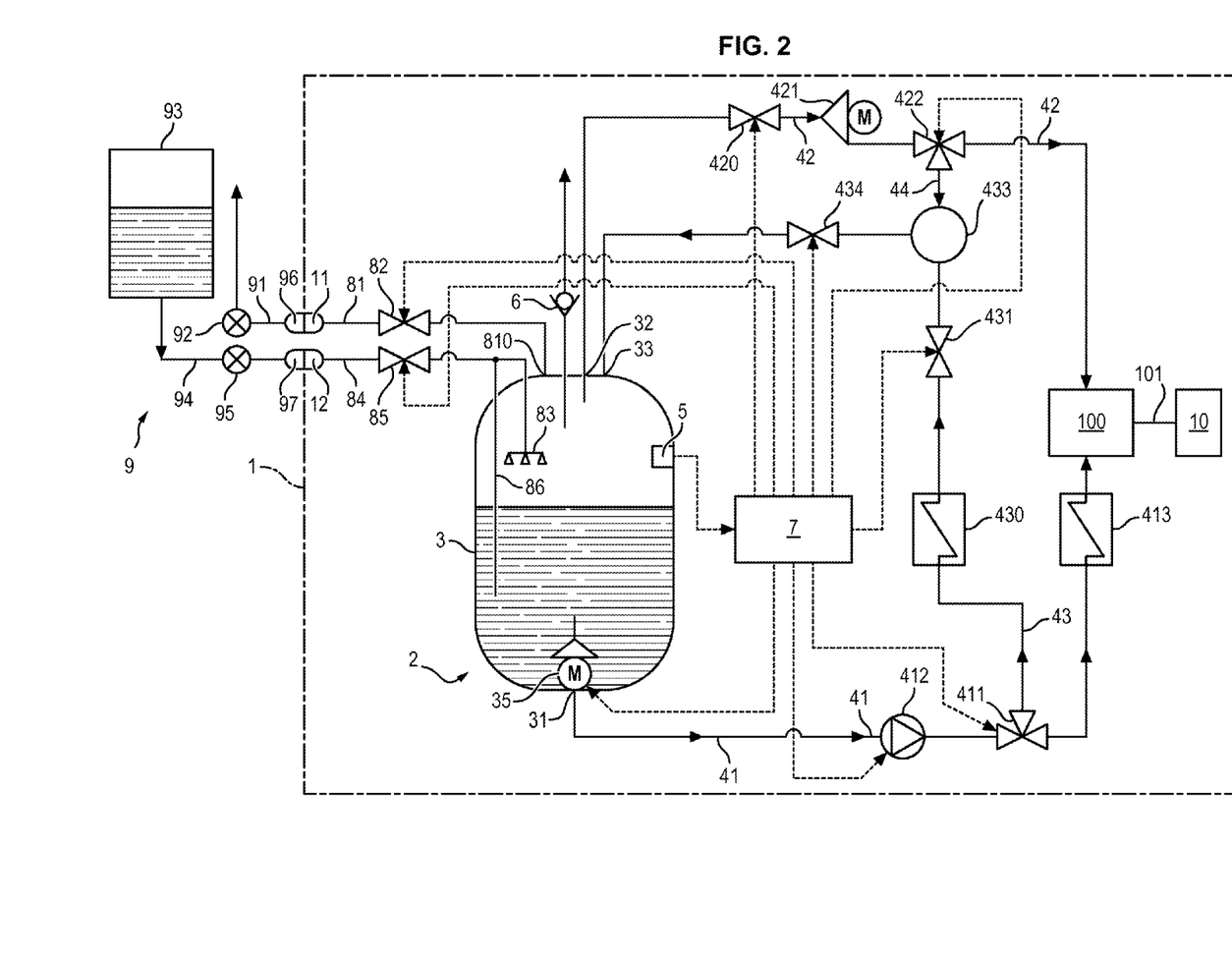
FIG. 2 is a diagram representing a second embodiment of the aforementioned assembly.

Finally, for reasons of consistency with the terminology used in the claims, this three-way valve 411 will be referred to as "second three-way valve" below.

The recirculation line 43 is equipped with a first liquid cryogenic fuel/hot fluid of the aircraft heat exchanger 430. This heat exchanger 430 allows changing the state of the liquid cryogenic fuel to bring it to the gaseous state, with a view to reintroducing it into the top part of the tank 3.

Furthermore, advantageously, an on/off valve 431 is disposed on the recirculation line 43, downstream of the heat exchanger 430, to authorize or not the passage of gas towards the tank 3.

The line 43 can be connected:

either directly to the lower part of the tank 3 by a tapping fitting 34 and it is then provided with a second regulation valve 432 while the first line 41 is provided with the first regulation valve 410 (see the embodiment represented in FIG. 1), or to the second three-way valve 411 located on the first line 41, (see the embodiment represented in FIG. 2). This second three-way valve 411 then replaces the first regulation valve and the second regulation valve.

Optionally, a second liquid cryogenic fuel/hot fluid of the aircraft heat exchanger 413 is disposed between the valve 410 or 411 and the mixing chamber 100. This exchanger 413 allows vaporizing the liquid fuel before it enters the mixing chamber 100, which then contains only fuel in the gaseous state.

The three-way valve 411 comprises an inlet connected to the pressurizing pump 412 and two outlets, respectively connected to the second exchanger 413 (and therefore to the mixing chamber 100) and to the recirculation line 43 upstream of the exchanger 430.

The second three-way valve 411 can occupy either a first position in which it connects the tank 3 exclusively to the mixing chamber 100, or a second position in which it connects the tank 3 exclusively to first heat exchanger 430, or a plurality of intermediate positions, in which it connects the tank 3 both to the mixing chamber 100 and to the first heat exchanger 430, while allowing a more or less significant flow rate to pass to one or the other, depending on the intermediate position in which it is located.

Preferably, the second line 42 is provided with a first control valve 420 (for example a two-way valve) disposed downstream of the tank 3 and with a compressor 421 disposed downstream of said valve 420, relative to in the direction of circulation of the gaseous cryogenic fuel in the second line 42.

Among the different hot fluids of the aircraft that can be used in the heat exchangers 413 or 430, mention may be made for example of the air coming from outside the aircraft (and which is at a temperature higher than that of the cryogenic fuel), of the air coming from the cabin or the exhaust of a gas turbine.

The mixing chamber 100, which receives the mixture of the cryogenic fuels in the two liquid and gaseous states coming from the two lines 41 and 42, is connected to the combustion chamber 10 by a line 101. An injector (not represented in the figure), disposed at the inlet of the combustion chamber 10, allows introducing the cryogenic fuel in the gaseous state, inside the combustion chamber 10.

At least one pressure sensor 5 is disposed inside the tank 3 in order to detect the pressure prevailing inside the latter. This sensor is disposed in the upper part of the tank 3, above the level of fuel in the liquid state.

Advantageously, the on-board tank 3 also comprises a safety valve 6 disposed in its upper part. This valve is calibrated at a safety pressure which is both higher than the atmospheric pressure and higher than a setpoint pressure. It has the function of releasing the cryogenic fuel in the gaseous state, out of this on-board tank 3, if the pressure inside the latter exceeds said safety pressure.

Figure 1:
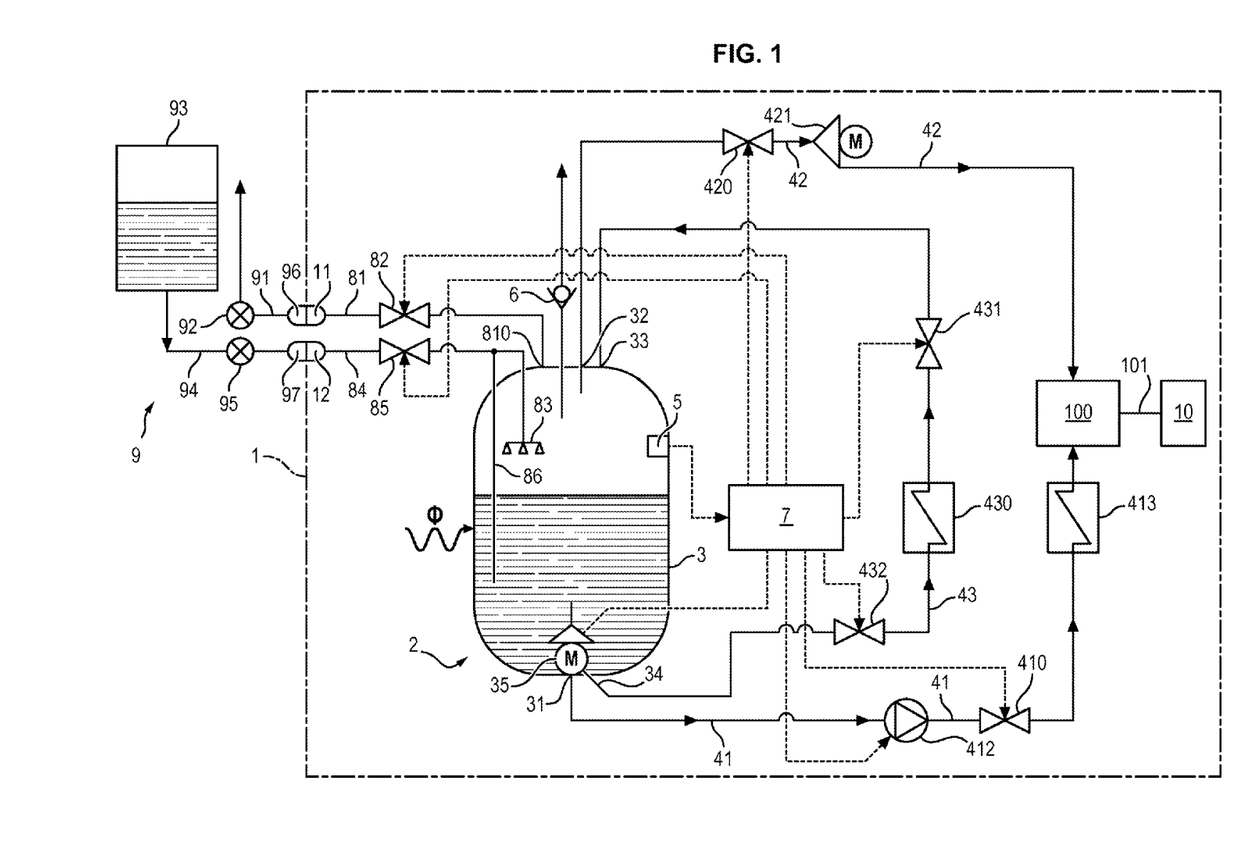
FIG. 1 is a diagram representing a first embodiment of an assembly for regulating the pressure inside an on-board cryogenic fuel storage tank, this fuel supplying the combustion chamber of an aircraft turbomachine.

According to a first simplified alternative embodiment of the invention, represented in FIG. 1, the recirculation line 43 is connected directly to the tapping fitting 33, downstream of the on/off valve 431.

According to a second alternative embodiment of the invention, represented in FIG. 2, the recirculation line 43 is connected to the tapping fitting 33, via a gas buffer tank 433 (or "capacity") located downstream of the on/off valve 431. This buffer tank 432 contains gas at a higher pressure than the pressure prevailing in the on-board tank 3. It is used to maintain this tank 3 under pressure.

In this case, a second control valve 434 is disposed on the recirculation line 43, downstream of said buffer tank 433. Finally, a three-way valve 422 (hereinafter referred to as first three-way valve) is disposed on the second line 42, downstream of the compressor 421. It comprises an inlet way connected to the compressor 421 and two outlet ways respectively connected to the mixing chamber 100 and to said buffer tank 433, by a bypass line 44. The valve 422 can occupy either a first position in which it connects the tank 3 exclusively to the mixing chamber 100, or a second position in which it connects the tank 3 exclusively to the buffer tank 433, or a plurality of intermediate positions in which it connects the tank 3 both to the mixing chamber 100 and to the buffer tank 433, while allowing a more or less significant flow rate to pass to one or the other, depending on the intermediate position in which it is located.

Finally and although it is not represented in the figures, it will be noted that it is possible to have the buffer tank 433, as in FIG. 2, but that the recirculation line 43 is connected with the connections and the valves 432, 410 as in FIG. 1.

At least one central unit 7, such as a computer or a processor, receives information in particular from the pressure sensor 5 and controls the operation of the valves 410, 431, 432, 434 and 420, the operation of the three-way valves 411 and 422, the on/off operation of the booster pump 35 and of the pressurizing pump 412 and the on/off operation of the compressor 421, depending on this information and as explained below.

For this purpose, the computer comprises a memory in which a computer program is stored, this program comprising code instructions which allow a machine to implement these method steps.

The buffer tank 433 can be supplied in two manners.

When the second three-way valve 411 is in the first position (or when the first regulation valve 410 is open and the second regulation valve 432 is closed), for example on takeoff of the aircraft and when the mixing chamber 100 is supplied with liquid fuel, then the first three-way valve 422 is placed in the second position and the buffer tank 433 is supplied with gaseous cryogenic fuel derived from the upper part of the tank 3, then compressed by the compressor 421 and introduced via the bypass line 44. Meanwhile, the second control valve 434 is closed.

Conversely, in the case where the fuel flow rate in the gaseous state, that is to say boil-off, is sufficient to supply the mixing chamber 100, the first three-way valve 422 is placed in the first position. However, it can also be placed in an intermediate position and then the buffer tank 433 is supplied with the gaseous fuel leaving the compressor 421, the valve 434 being closed.

The buffer tank 433 is filled in particular when its inner pressure becomes lower than a predetermined threshold pressure, which is itself higher than the working pressure of the tank 3.

The buffer tank 433 is dimensioned so as to be able to maintain the pressure in the tank 3, the time for the recirculation line 43 to be supplied with liquid fuel and for the evaporator 430 to start producing gas. The response time for regulating the pressure in the tank 3 is thus shortened, compared to the first alternative embodiment, without this buffer tank 433.

The operation of the regulation device 2 is as follows:

As long as the pressure sensor 5 returns to the central unit 7, the information according to which the pressure inside the on-board tank 3 is equal to a setpoint pressure or is comprised in a range of setpoint values, the central unit 7 closes the valves 431, 432 and/or controls the three-way valves 411 and 422 (depending on the alternative embodiment), so that neither the recirculation line 43 nor the buffer tank 433 (if present) are connected to the lines 41 and 42 and moreover controls the pumps 35 and 412 as well as the valve 420 and the compressor 421, so that the mixing chamber 100 is supplied with liquid cryogenic fuel and gaseous cryogenic fuel, according to proportions resulting from the needs of the aircraft 1, depending on its flight phase.

If the pressure in the on-board tank 3, detected by the pressure sensor 5, is lower than the setpoint pressure (or lower than the lower bound of the range of setpoint values), and as long as it remains so, the second regulation valve 432 is opened or the second three-way valve 411 is put in the second position, the second control valve 434 (if present) is opened and the liquid cryogenic fuel passes through the heat exchanger 430, changes phase and is returned to the gaseous state in the upper part of the tank 3. This gas intake causes a pressure increase in the tank 3. If the buffer tank 433 is present, it acts as explained previously.

Conversely, if the pressure detected by the pressure sensor 5 is greater than the setpoint pressure or greater than the upper bound of the range of setpoint values, then the flow rate of gas taken from the second line 42 is increased by acceleration of the compressor 421 (the valve 420 is therefore opened) and the liquid flow rate circulating in the first line 41 is reduced by controlling the valves 410 or 411 so that the (liquid and gaseous) cryogenic fuel flow rate arriving in the engine always corresponds to the engine needs.

Finally, if the pressure in the tank 3 becomes higher than the safety pressure, then the valve 6 opens and releases gas outside the tank 3 to bring back the pressure therein below this safety pressure value.

The pressure regulating device 2, in accordance with the invention, can be advantageously completed by an additional facility that allows regulating the pressure inside the on-board tank 3, during a phase where the aircraft 1 is on the ground and parked, for example at night.

To this end, this device 2 comprises a line 81 for discharging the gases opening out at the upper part of the tank 3, at the level of a tapping fitting 810. It allows connecting the tank 3 to an outlet fitting 11 of the aircraft opening out outside. This discharge line 81 is provided with a monitoring valve 82, whose opening and closing are controlled by said central control unit 7.

Furthermore, this outlet fitting 11 is configured to be able to be connected via a suction line 91 to a gas suction device 92, which allows extracting the gas and sending it, for example, to a reliquefaction device installed in the airport.

The suction line 91 can for example be connected to the fitting 11, by a fitting 96.

Advantageously, the pressure regulating device 2 also comprises a device 83 for spraying cryogenic fuel in the liquid state, disposed inside the on-board tank 3, in its upper part. This spray device 83 is connected to a liquid supply line 84 provided with an inlet fitting 12 opening out outside the aircraft 1. The line 84 is provided with a monitoring valve 85 whose opening and closing are controlled by the central control unit 7.

The spray device 83 is preferably used when the tank 3 is hot. The gas accumulated in its upper part is then also hot and promotes the vaporization of the liquid sprayed via the device 83. This spray device also allows standardizing the filling of liquid and avoiding creating a cold spot on the structure of the tank 3, which would weaken it.

The inlet fitting 12 is configured to be able to be connected via an introduction line 94, to an outer cryogenic fuel storage tank 93 of an airport, in order to supply the device 83 with fuel in the liquid state.

The introduction line 94 is provided with a pumping device 95 and a fitting 97, configured to be paired with the inlet fitting 12.

Finally, the on-board tank 3 can also be provided with a liquid filling line 86 which opens out in its low part, this line 86 being able either to be connected to the line 84, downstream of the valve 85, or to open out on an inlet fitting of the aircraft, not represented in the figures.

Thanks to this additional facility, when the aircraft 1 is stopped, the suction 91 and introduction 94 lines are connected to the aircraft 1 and if the pressure sensor 5 detects that the pressure in the tank 3 is lower than the setpoint pressure (or lower than the lower bound of the range of setpoint values), and as long as it remains so, the central control unit 7 keeps the valves 420, 432, 410 and 411 closed (these valves are permanently closed if the engines are not on and the aircraft is connected to the airport, except possibly the valve 432 which can be used to raise the pressure). Furthermore, the unit 7 controls the opening of the monitoring valve 85, as well as the starting of the pumping device 95 so as to suck the cryogenic fuel which is in the outer tank 93 and to introduce it into the on-board tank 3.

Furthermore, if the pressure detected in the tank 3 by the sensor 5 exceeds the setpoint pressure or the upper bound of the range of setpoint values, then the central control unit 7 opens the monitoring valve 82 and starts the gas suction device 92, so that the gaseous cryogenic fuel is discharged to the airport facility.

Furthermore, as previously described, if the pressure in the tank 3 becomes higher than the safety pressure, then the valve 6 opens.

Finally, when the liquid fuel level falls below a predetermined threshold (measured by a sensor), fuel is added in the tank.

The spray device 83 is used when the tank is "hot" (that is to say at ambient temperature, and when there is then no cryogenic liquid in the tank 3). This spray device 83 allows, with the spraying of droplets, not creating thermal shocks on the metal of the tank 3, which would occur if the flow rate was directly poured using the line 86. If the on-board tank 3 is already in "cold", the line 86, which has a higher flow rate, is then used.

The invention claimed is:

1. A pressure regulating device for regulating the pressure inside an on-board storage tank for cryogenic fuel, part of which being in a liquid state and another part of which being in a gaseous state, the on-board storage tank being mounted in an aircraft provided with a turbomachine, the cryogenic fuel being intended to supply a combustion chamber of the turbomachine, the pressure regulating device comprising:

a booster pump, located at a lower part of the on-board storage tank, a mixing chamber, configured to be connected to said combustion chamber, a first line connecting the on-board storage tank to said mixing chamber in order to allow the mixing chamber to be supplied with the cryogenic fuel in the liquid state, this first line being provided with at least one pressurizing pump and a first regulation valve, this mixing chamber being connected to the combustion chamber, a second line connecting the on-board storage tank to said mixing chamber in order to allow the mixing chamber to be supplied with the cryogenic fuel in the gaseous state, the second line being provided with at least one compressor and a first control valve, a recirculation line connecting the booster pump to an upper part of the on-board storage tank, this recirculation line being equipped with a second regulation valve and with a first heat exchanger that allows the cryogenic fuel to pass from the liquid state to the gaseous state, a buffer tank disposed on the recirculation line downstream of the first heat exchanger and a second control valve disposed on the recirculation line between the buffer tank and the upper part of the on-board storage tank, wherein a first three-way valve with an inlet way and two outlet ways is disposed on said second line so that the inlet way is connected downstream of the compressor, one of the two outlet ways is connected to the mixing chamber and another of the two outlet ways is connected to the buffer tank by a bypass line, wherein the first three-way valve can be put either in a first position in which the first three-way valve connects the tank exclusively to the mixing chamber, or in a second position in which the first three-way valve connects the on-board storage tank exclusively to the buffer tank to allow the buffer tank to be filled with the cryogenic fuel in the gaseous state compressed by the compressor, or in a plurality of intermediate positions in which the first three-way valve connects the on-board storage tank both to the mixing chamber and to the buffer tank, while allowing a more significant flow rate or a less significant flow rate to pass to the mixing chamber or the buffer tank, depending on which of the plurality of intermediate positions the first three-way valve is located, a pressure sensor detecting the pressure inside the on-board storage tank, and a central control unit receiving pressure data from the pressure sensor and controlling the total or partial opening or the closing of the first regulation valve and of the second regulation valve and of the first control valve and of the second control valve and of the first three-way valve and the starting or stopping of the pressurizing pump, the booster pump and the compressor, as a function of a value of a setpoint pressure inside the on-board storage tank.

2. The pressure regulating device according to claim 1, wherein a second heat exchanger is disposed on the first line, between the first regulation valve and the mixing chamber to vaporize the liquid cryogenic fuel before entering the mixing chamber.

3. The pressure regulating device according to claim 1, wherein the first regulation valve and the second regulation valve are only one second three-way valve, which is disposed on said first line, downstream of the pressurizing pump, wherein the second three-way valve has an inlet way and two outlet ways, so that the inlet way of the second three-way valve is connected to this pressurizing pump, one of the two outlet ways is connected to the mixing chamber and another of the two outlet ways is connected to the recirculation line upstream of the first heat exchanger, and wherein this second three-way valve is controlled by said central control unit to be put either in a first position in which it connects the on-board storage tank exclusively to the mixing chamber, or in a second position in which the second three-way valve connects the tank exclusively to the first heat exchanger, or in a plurality of intermediate positions in which the second three-way valve connects the on-board storage tank both to the mixing chamber and to the first heat exchanger, while allowing a more significant flow rate or a less significant flow rate to pass to the mixing chamber or the first heat exchanger, depending on which of the plurality of intermediate positions the second three-way valve is located.

4. The pressure regulating device according to claim 1, wherein the pressure regulating device comprises a valve disposed at the upper part of the on-board storage tank, calibrated at a safety pressure, higher than atmospheric pressure and than said setpoint pressure and which allows releasing the cryogenic fuel in the gaseous state, out of the on-board storage tank, if the pressure inside the on-board storage tank exceeds the safety pressure.

5. The pressure regulating device according to claim 1, wherein the first heat exchanger is a heat exchanger realizing a heat exchange between the cryogenic fuel circulating in the first line and a hot fluid of the aircraft, the hot fluid of the aircraft being chosen among air coming from outside the aircraft, air coming from a cabin or an exhaust of a gas turbine.

6. The pressure regulating device according to claim 1, wherein the pressure regulating device comprises a gas discharge line opening out at the upper part of the on-board storage tank and which connects the on-board storage tank to an outlet fitting of the aircraft which opens out outside the aircraft, this gas discharge line being provided with a monitoring valve whose opening and closing are controlled by the central control unit, the outlet fitting of the aircraft being configured to be able to be connected, via a suction line, to a gas suction pump of an airport facility.

7. The pressure regulating device according to claim 1, wherein the pressure regulating device comprises a sprayer for spraying the cryogenic fuel in the liquid state, disposed inside the on-board storage tank, in the upper part of the on-board storage tank, the sprayer being connected to a liquid supply line provided with an inlet fitting of the aircraft which opens out outside the aircraft, the liquid supply line being provided with a monitoring valve whose opening and closing are controlled by the central control unit, the inlet fitting of the aircraft being configured to be able to be connected, via an introduction line, to an introduction pump of an airport facility and to an outer cryogenic fuel storage tank of an airport, to supply the sprayer with the cryogenic fuel in the liquid state.

8. The pressure regulating device according to claim 1, wherein the pressure regulating device comprises a filling line which opens out at the lower part of the on-board storage tank, the filling line being provided with a monitoring valve whose opening and closing are controlled by the central control unit, the filling line also being provided with an inlet fitting opening out outside the aircraft, the inlet fitting being configured to be able to be connected, via an introduction line, to an introduction pump of the aircraft facility and to an outer cryogenic fuel storage tank of an airport, to supply the on-board storage tank with the cryogenic fuel in the liquid state.

9. The aircraft comprising the at least one on-board storage tank for the cryogenic fuel, and the at least one turbomachine provided with the combustion chamber operating with said cryogenic fuel in the liquid state and in the gaseous state, wherein the aircraft comprises the pressure regulating device in accordance with claim 1.

10. A method for regulating the pressure inside the on-board storage tank for the cryogenic fuel in the liquid or the gaseous state, the on-board storage tank being located inside the aircraft which comprises the pressure regulating device according to claim 1, the cryogenic fuel supplying the combustion chamber of the turbomachine of said aircraft, the method comprising:

detecting the pressure inside the on-board storage tank by using said pressure sensor, comparing this pressure with the setpoint pressure, and when the pressure in the on-board storage tank is lower than the setpoint pressure, opening the second regulation valve and starting the booster pump, so as to transform the liquid cryogenic fuel into gaseous cryogenic fuel in the first heat exchanger and to reinject the gaseous cryogenic fuel into the upper part of the on-board storage tank and opening the second control valve to transfer the compressed gaseous cryogenic fuel contained in said buffer tank to the on-board storage tank, until the pressure inside the on-board storage tank is equal to the setpoint pressure.

11. The pressure regulating device according to claim 1, wherein a second heat exchanger is a heat exchanger realizing a heat exchange between the cryogenic fuel circulating in the first line and a hot fluid of the aircraft, the hot fluid of the aircraft being chosen among air coming from outside the aircraft, air coming from a cabin or an exhaust of a gas turbine.

12. An assembly for regulating the pressure inside the on-board storage tank for the cryogenic fuel in the liquid or the gaseous state, the assembly comprising:
the aircraft and the airport facility,
wherein the aircraft comprises the on-board storage tank and the at least one turbomachine provided with the combustion chamber supplied with said cryogenic fuel and the pressure regulating device according to claim 6,
and wherein the airport facility comprises at least one outer cryogenic fuel storage tank, at least one suction line and/or at least one introduction line, the said suction line being provided with the gas suction pump and being connected to a suction fitting configured to be able to be connected to the outlet fitting of the aircraft, the introduction line being provided with an introduction pump and being connected to said outer cryogenic fuel storage tank and to an introduction fitting configured to be able to be connected to an inlet fitting of the aircraft.

13. An assembly for regulating the pressure inside the on-board storage tank for the cryogenic fuel in the liquid or the gaseous state, the assembly comprising:
the aircraft and the airport facility,
wherein the aircraft comprises the on-board storage tank and the at least one turbomachine provided with the combustion chamber supplied with said cryogenic fuel and the pressure regulating device according to claim 7,
and wherein the airport facility comprises at least one of the outer cryogenic fuel storage tank, at least one suction line and/or at least one of the introduction line, the at least one suction line being provided with a gas suction pump and being connected to a suction fitting configured to be able to be connected to the outlet fitting of the aircraft, the introduction line being provided with the introduction pump and being connected to said outer cryogenic fuel storage tank and to an introduction fitting configured to be able to be connected to an inlet fitting of the aircraft.

14. A method for regulating the pressure inside the on-board storage tank for the cryogenic fuel in the liquid or the gaseous state, wherein the method is implemented with the assembly according to claim 12, the method comprising the steps of:
detecting the pressure inside the on-board storage tank by using said pressure sensor,
comparing this pressure with the setpoint pressure,
if the pressure in the on-board storage tank is lower than the setpoint pressure, opening the monitoring valve of the liquid supply line and starting the introduction pump of the airport facility to suck the cryogenic fuel in the liquid state from the at least one outer cryogenic fuel storage tank and to introduce the cryogenic fuel into the on-board storage tank and if the pressure in the on-board storage tank is higher than the setpoint pressure, opening the monitoring valve of the gas discharge line and starting the gas suction pump of the airport facility to suck the cryogenic fuel in the gaseous state located in the on-board storage tank,
these steps being done while the aircraft is stopped and is connected to the airport facility.

* * * * *